US012478543B2

(12) United States Patent
Plamondon

(10) Patent No.: US 12,478,543 B2
(45) Date of Patent: Nov. 25, 2025

(54) HARNESS ADAPTED TO SUPPORT A VIBRATOR

(71) Applicant: Any Plamondon, Val-des-Monts (CA)

(72) Inventor: Any Plamondon, Val-des-Monts (CA)

(73) Assignee: Any Plamondon, Val-des-Monts (CA)

( * ) Notice: Subject to any disclaimer, the term of this patent is extended or adjusted under 35 U.S.C. 154(b) by 0 days.

(21) Appl. No.: 18/869,117

(22) PCT Filed: Nov. 29, 2022

(86) PCT No.: PCT/CA2022/051744

§ 371 (c)(1),
(2) Date: Nov. 25, 2024

(87) PCT Pub. No.: WO2023/230698

PCT Pub. Date: Dec. 7, 2023

(65) Prior Publication Data

US 2025/0170014 A1 May 29, 2025

(30) Foreign Application Priority Data

Jun. 2, 2022 (CA) ................................ CA 3161438

(51) Int. Cl.
*A61H 19/00* (2006.01)
*A61H 37/00* (2006.01)

(52) U.S. Cl.
CPC ............. *A61H 19/34* (2013.01); *A61H 37/00* (2013.01); *A61H 2201/1628* (2013.01); *A61H 2201/1652* (2013.01)

(58) Field of Classification Search
CPC ........ A61H 19/00; A61H 19/30; A61H 19/34; A61H 19/40; A61H 19/44; A61H 19/50
See application file for complete search history.

(56) References Cited

U.S. PATENT DOCUMENTS

| | | | | |
|---|---|---|---|---|
| 4,834,113 A | 5/1989 | Reddy | | |
| 5,103,810 A * | 4/1992 | Chang | A61H 19/40 | 600/39 |
| 2012/0118296 A1* | 5/2012 | Oeltjen | A61H 19/44 | 128/845 |

FOREIGN PATENT DOCUMENTS

| | | | | |
|---|---|---|---|---|
| CN | 112773690 * | 5/2021 | A61H 39/04 |
| CN | 112773690 A | 5/2021 | |
| GB | 2549690 * | 1/2017 | A61H 19/50 |
| GB | 2549690 A | 11/2017 | |

* cited by examiner

*Primary Examiner* — Carrie R Dorna
(74) *Attorney, Agent, or Firm* — Benoit & Côté Inc.; Danny Higgins

(57) ABSTRACT

A harness adapted to support a vibrator for hands-free stimulation of a clitoral area of a user comprises a waist portion, a right and a left leg portions, a crotch portion and a length-adjustable pubis portion. The crotch portion has a support connected to the right leg portion and to the left leg portion intermediate a front portion and a rear portion of the waist portion. The support has an aperture and a securing means on an exterior of the support adapted to secure the vibrator between the securing means and the support so that an active extremity of the vibrator is located proximate or within the aperture. The adjustable pubis portion allows to accurately position the aperture over a clitoral area so that an active portion of the vibrator is located through the aperture and reaches the clitoral area.

13 Claims, 5 Drawing Sheets

HARNESS ADAPTED TO SUPPORT A VIBRATOR

FIELD OF THE INVENTION

The present invention generally relates to the field of undergarments and sexual toys. More specifically, the invention relates to a harness for a women adapted to provide hands-free use of a vibrator during sexual intercourse.

BACKGROUND OF THE INVENTION

Sexual orgasm is usually the desired outcome of a sexual activity. However, many women often have difficulty reaching sexual climax or orgasm without clitoral stimulation during such sexual activity.

Clitoral stimulation may be obtained through the use of a vibrator, for example. However, the use of a vibrator is not a guarantee of success. For one, the use of a vibrator requires much precision and consistency to properly stimulate the clitoral erogenous area. The type of vibrator also plays an important role: for example, some women may be more responsive to a suction type of vibrator or on the contrary be more responsive to the traditional vibration-inducing only type of vibrator. Moreover, the use of the vibrator during sexual intercourse can get physically demanding as it must be held in place in a relatively small zone for a relatively long time. The use of the vibrator may even be impossible while adopting certain sexual positions.

Other difficulties exist for some women because the simple manipulation of a vibrator becomes a distraction during sexual intercourse, which delays or prevents the desired result of reaching the orgasm.

To solve such issues, many solutions have been proposed to help women reach the orgasm during sexual intercourse.

For example U.S. Pat. No. 6,991,598 to Klein and U.S. Patent Application no. 2004/0186343 to Moore-Steele disclose underwear designed to sexually stimulate a woman in the crotch area. However, these devices are not adapted to be worn during sexual intercourse.

U.S. Pat. No. 8,109,869 to Beaulieu discloses a harness incorporating a vibrator and designed to be worn by a person during sexual intercourse in order to stimulate its partner. It therefore lacks flexibility as it cannot be used for masturbation. Moreover, the apparatus is designed so that its vibrating portion is not at the level of the wearer's genitals but rather in proximity. Also, the harness is provided with its own vibrator, which may not be of the type preferred by a person contemplating its use.

U.S. Patent Application No. 2014/0221885 to Fleschere presents a panty designed to be used during sexual intercourse and equipped with a pocket for inserting a vibrator. However, in practice, it is not suited to adequately locate and retain in place the vibrator inserted therein, thereby reducing the probabilities for the wearer of reaching the orgasm.

There is therefore a need for an improved sexual device which properly stimulates the clitoral area of a woman and which is convenient to use during sexual intercourse.

SUMMARY OF THE INVENTION

It is an object of the present invention to provide a harness adapted to support a vibrator that overcomes or mitigates one or more disadvantages of known such harnesses, or at least provides a useful alternative.

The invention provides the advantage of allowing hands-free use of a sexually stimulating device such as a vibrator.

In accordance with an embodiment of the present invention, there is provided a harness adapted to support a vibrator for hands-free stimulation of a clitoral area of a user. The harness comprises a waist portion, a crotch portion, a pubis portion a right leg portion and a left leg portion. The waist portion is adapted to surround a waist of the user. The waist portion has a front portion and a rear portion respectively adapted to rest on a front and on a rear of the user when in use. The portion has a support having a front edge, a rear edge, an aperture and a securing means. The securing means is attached to the support on an outer side of the support at least partially between the front edge and the aperture. The pubis portion connects the front portion of the waist portion to the support proximate the front edge. The pubis portion comprises a first length adjuster. The right leg portion, adapted to surround a right leg of the user at least partially, connects the rear portion of the waist portion to the support proximate the rear edge. The left leg portion, adapted to surround a left leg of the user at least partially, connects the rear portion of the waist portion to the support proximate the rear edge. The first length adjuster of the pubis portion is operative to adjust a distance between the front portion of the waist portion and the aperture of the support so that the aperture is located at a predetermined position proximate a clitoral area of the wearer. The securing means is operative to secure the vibrator against the support so that an active extremity of the vibrator is located proximate or within the aperture.

Optionally, the crotch portion, the pubis portion, the right leg portion, and the left leg portion are made of non-stretchable fabric. The waist portion may also be made of non-stretchable fabric.

Optionally, the right leg portion, the left leg portion, and the waist portion each comprise one second length adjuster to be adjustable in length. The first length adjuster and the second length adjusters may comprise a hook and loop type of fastener.

Optionally, the securing means is an outer layer defining a pocket closed proximal lateral sides of the support and proximal the rear edge of the support. The pocket has an opening proximate the front edge. Both the opening and the aperture reach inside the pocket. The pocket is elongated along a front-rear axis of the support so as to be operative to receive the vibrator having a longitudinal axis aligned with the front-rear axis and to locate an active extremity of the vibrator proximate or within the aperture. The pocket is adapted to receive either a suction-type of vibrator having an active nozzle or an acupressure type of vibrator. The aperture is adapted to receive the active nozzle of the vibrator.

Optionally, the rear edge may be at a predetermined distance from the aperture so that in use, when the aperture is located at the predetermined position proximate the clitoral area of the wearer, the rear edge of the support is located between the clitoral area and a vaginal orifice of the user so that the vaginal orifice is uncovered by the support.

Optionally, the waist portion, the right leg portion, the left leg portion and the pubis portion may be made of webbing.

Optionally, the crotch portion may be detachable from the right leg portion, from the left let portion and from the pubis portion. To this extent, a plurality of detachable attachments is provided. A first of the plurality of detachable attachments removably attaches the crotch portion to the right leg portion, a second of the detachable attachments removably attaches the crotch portion to the left leg portion and a third of the detachable attachments removably attaches the crotch portion to the pubis portion. The detachable attachments may be located along one of the front edge and the rear edge of the support depending on which element they attach together.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a harness or harness adapted to support or enclose a vibrator for hands-free stimulation of a clitoral area of a user.

Figure 1:
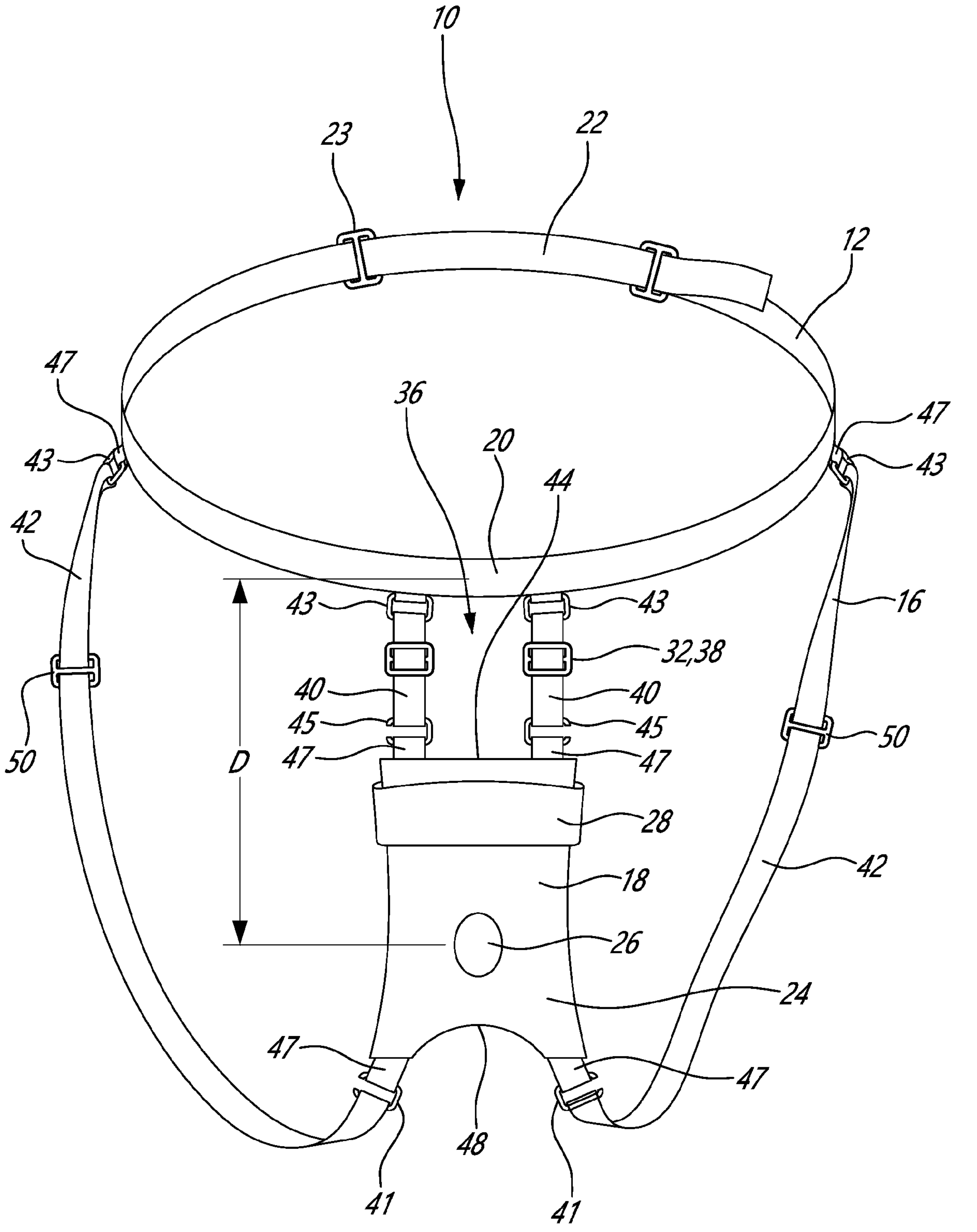
FIG. 1 is a perspective view of a harness adapted to support a vibrator in accordance with an embodiment of the present invention.

FIG. 1 is referred to. The harness 10 is designed to be worn by a person similarly to an underwear. The harness 10, which could also be described as a harness, comprises a waist portion 12, a right leg portion 14, a left leg portion 16, a crotch portion 18 and a pubis portion 36. The waist portion 12, which is adapted to surround a waist of the user, has a front portion 20 and a rear portion 22 respectively adapted to rest against a front and a rear of the user when in use. The waist portion 12 is adjustable to fit a range of waist size of users. The waist portion 12 may be stretchable or adjustable using known adjusting devices 23 such as a belt buckle, a slider adjuster or hook and loop (Velcro®) material. The right leg portion 14, is designed to at least partially surround a right leg of the user by itself and to completely surround the right thigh of the user when combined with other portions of the harness 10. This is similar with the left leg portion 16 regarding a left leg, and particularly the left thigh, of the user. Both the right leg portion 14 and the left leg portion 16, directly or indirectly, connect the front portion 20 of the waist portion 12 to its rear portion 22.

The crotch portion 18 has a support 24 connected to the right leg portion 14 and to the left leg portion 16 between the front portion 20 and the rear portion 22 of the waist portion 12. The support 24 is provided with both an aperture 26 and a securing means 28 which is located on an exterior of the support 24. The aperture 26 may take different shapes, for example, circular, ovoid, elliptical, or polygonal. The support 24 has a front edge 44 proximal the front portion 20 of the waist portion 12 and a rear edge 48 which is distal the front portion 20. The rear edge 48 is typically positioned to leave substantially uncovered a vaginal orifice of the user so as to not interfere with a penis of a partner during penetration. The rear edge 48 may be arcuate.

Figure 2:
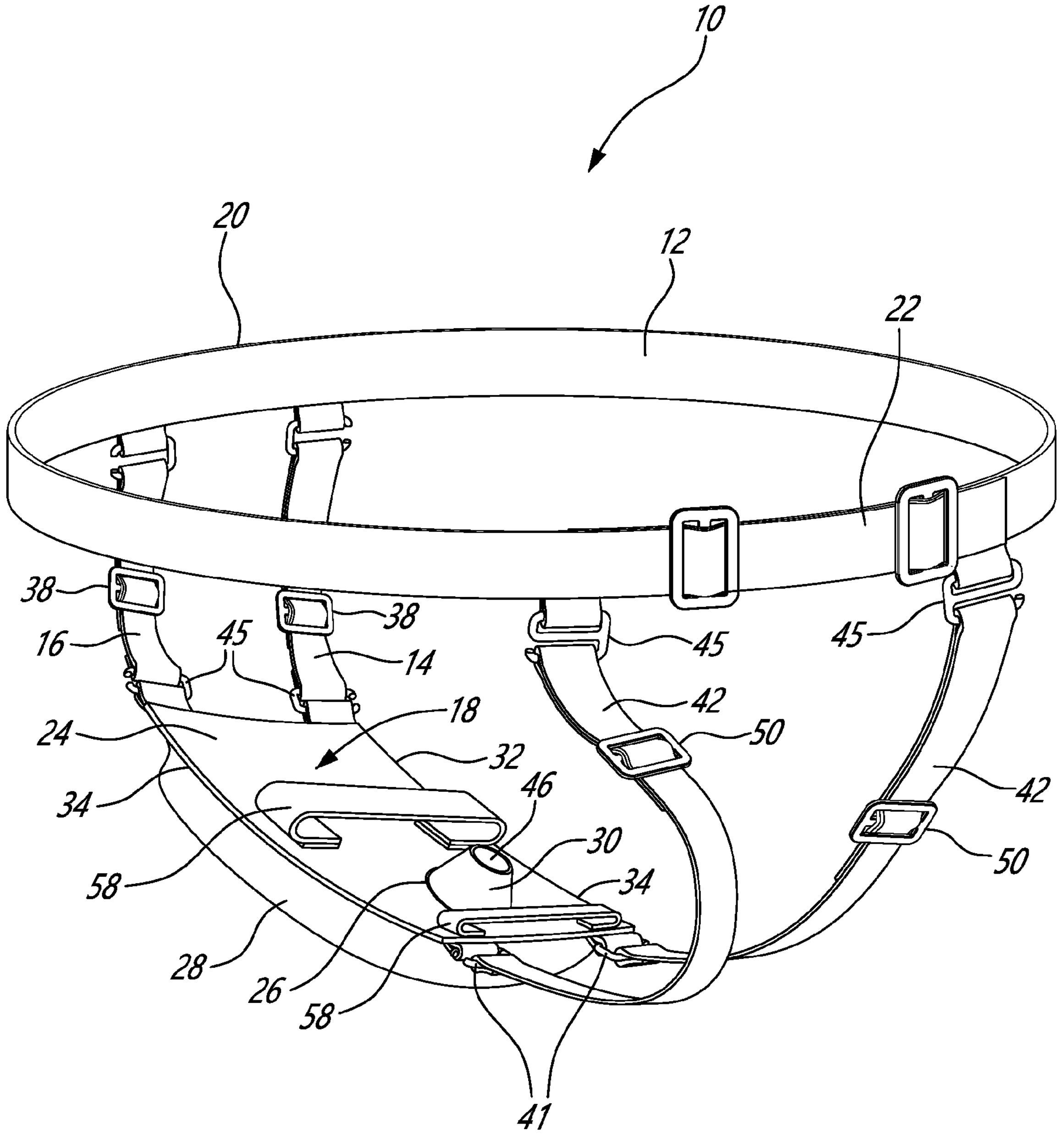
FIG. 2 is a perspective view of a harness adapted to support a vibrator in accordance with another embodiment of the present invention.

Longitudinally, the securing means 28 is at least partially located between the front edge 44 and the aperture 26, or optionally even stretches between the front edge 44 and the rear edge 48, thereby covering the aperture 26. This position allows securing the vibrator 30 between the securing means 28 and the support 24 so that an extremity of the vibrator 30 is located proximate the aperture 26, or even extends through the aperture 26. This is best shown in FIG. 2, now concurrently referred to. In FIG. 2, the securing means 28 covers the whole area of the aperture 26 to define a pocket 54 as will be detailed further below.

In order to better fit a specific anatomy of the user, the pubis portion is further be provided with an adjusting means 32. The adjusting means 32 is operative to adjust a position of the aperture 26 with respect to the front portion 20 of the waist portion 12. The adjusting means 32 thereby allows positioning the aperture 26 proximate the clitoral area of the user when in use. As best shown in FIG. 1, the pubis portion 36 connects the front portion 20 of the waist portion 12 to the crotch portion 18. The pubis portion 36 comprises an adjuster 38 for adjusting a distance D between the front portion 20 and the aperture 26 of the support 24. Many types of adjusters 38 may be used, such as the typical slider adjuster depicted in FIG. 2. Alternatively, a hook-and-loop type of fastener may also be used to adjust the length. The adjuster 38 is mounted to a strap 40, itself connecting the front portion 20 of the waist portion 12 to the crotch portion 18. Typically, the strap 40 is mounted to both the waist portion 12 and the crotch portion 18 through rings, if mounted permanently, or through C or G hooks 41 if removably mounted. In FIG. 1, each strap 40 is mounted with rings 43 to the waist portion 12 and mounted with hooks 45 to the crotch portion 18. The crotch portion 18 is then provided with loops 47 engageable by the hooks 45. Alternatively to using rings, the one or more strap 40 of the pubis portion 36 could be directly attached, for example sewn, to the waist portion 12.

The one or more strap 40 is mounted to the crotch portion 18 proximate the front edge 44 of the crotch portion 18. By moving the adjuster 38, the length of the strap 40 is adjusted and therefore the length of the pubis portion 36 and consequently the dimension D are also adjusted. This advantageously allows an active extremity 46 of the vibrator 30, such as a nozzle or a tip, to protrude through the aperture 26 and to be positioned proximate the clitoral area of the user or directly on the clitoris, depending both on the user preferences and on her anatomy.

Similarly to the pubis portion 36, the right and left leg portions 14, 16 may be made of straps 42 which connect the rear portion 22 of the waist portion 12 to the crotch portion 18, and more precisely proximate the rear edge 48 of the crotch portion 18. The right leg portion 14 and the left leg portion 16 may be adjustable in length with the use of adjusters 50. The adjusters 50 may be slider adjusters or the hook-and-loop type of fastener as already described.

Advantageously, at least one end of each the strap 42 may be mounted with a C or G hook for the crotch portion 18 to be detachable. For example, in FIG. 1, each strap 42 is mounted with a ring 43 to the waist portion 12 (could also be sewn directly) and with a hook 41 to the crotch portion 18, while in FIG. 2, the right and left leg portions 14, 16 are connected to the waist portion 12 through hooks 45. The right leg portion 14, the left leg portion 16, the pubis portion 36, the waist portion 12 and the crotch portion 18 may each preferably and independently be made of a non-stretchable type of material or fabric, such as webbing. Since all materials, including fabrics, are in fact stretchable up to a point, non-stretching is herein understood to mean a material or fabric which cannot be significantly stretched by hand. In particular, this can mean a material or a fabric devoid of elastic fibers or elastomers, or a knit fabric which cannot stretch due to its production method or due to looping. For example, the harness 10 may be partially or completely made of polypropylene, nylon or leather. Moreover, although slider adjusters have been discussed as adjustment means, any other suitable adjustment means known in the art could be used. Similarly, although C and G hooks have been provided as examples for removable attachment means, other suitable removable attachments means, such as buttons, pressure buttons, zippers, hook-and-loop fasteners, etc. known in the clothing industry could also be used.

Removeably mounting the crotch portion 18 to the pubis portion 36 allows easy cleaning of the crotch portion 18. It also allows mounting other crotch portions 18 having different dimensions or different features, for example, for mounting other sex toys than a vibrator, or other vibrators having different dimensions or features. For example, a different crotch portion 18 could be designed specifically for use by men.

Figure 4:
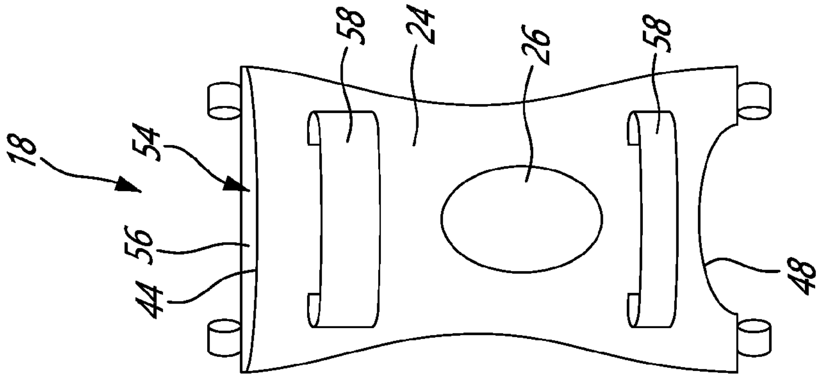
FIG. 4 is a top view of the crotch portion of FIG. 3.
Figure 3:
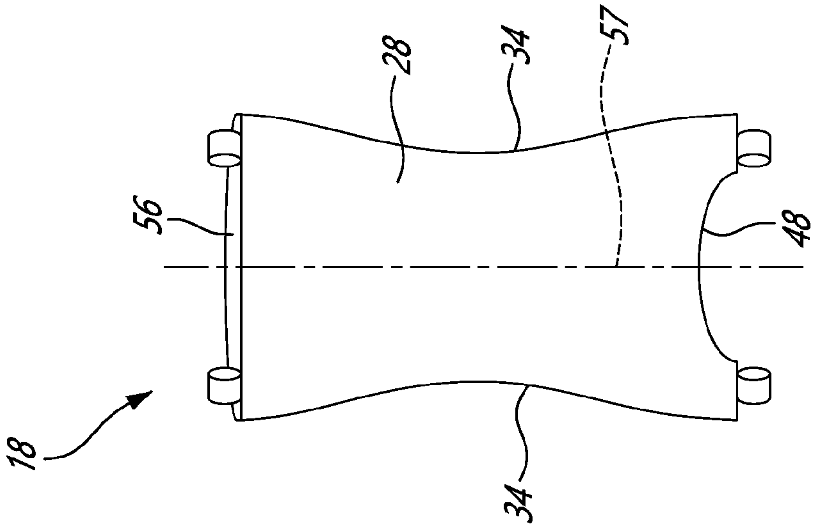
FIG. 3 is a bottom view of a crotch portion of the harness of FIG. 2.

FIGS. 3 and 4 are also now concurrently referred to. In order to accommodate a range of sizes of vibrators and to adequately secure the vibrator 30 in place, the securing means 28 may be made of a stretchable material. The securing means 28 may extend over the aperture 26 so much as to take the form of an outer layer attached either removeably or permanently to the support 24 along the sides 34 and the rear edge 48, thereby defining a pocket 54 having an opening 56 proximate the front edge 44. The opening 56 and the aperture 26 communicate together inside the pocket 54 so that the pocket 54 is operative to receive the vibrator 30 and to locate the active extremity 46 of the vibrator 30 proximate the aperture 26 or even through the aperture 26. The pocket 54 is elongated along a front-rear axis 57 of the support 24, substantially parallel to its lateral sides 34, so as to be operative to 1) receive the vibrator 30 with its longitudinal axis aligned with the front-rear axis 57; and to 2) locate an active extremity of the vibrator proximate the aperture or even through the aperture. In particular, the pocket 54 is adapted to receive a suction-type or acupressure-type of vibrator. This suction-type of vibrator has a suction nozzle which may be received in the aperture 26 so as to come in contact with the clitoral area, or the clitoris, when in use.

As shown in FIG. 4, secondary mounting points 58 can be provided to mount another vibrator or other sex toy on an exterior of the pocket 54, on an inner side (towards the body of the wearer or facing the skin of the wearer) of the support 24. The mounting points 58 are made of elastic bands and can be removably attached to the support 24 via a hook-and-loop type of fasteners.

Figure 6:
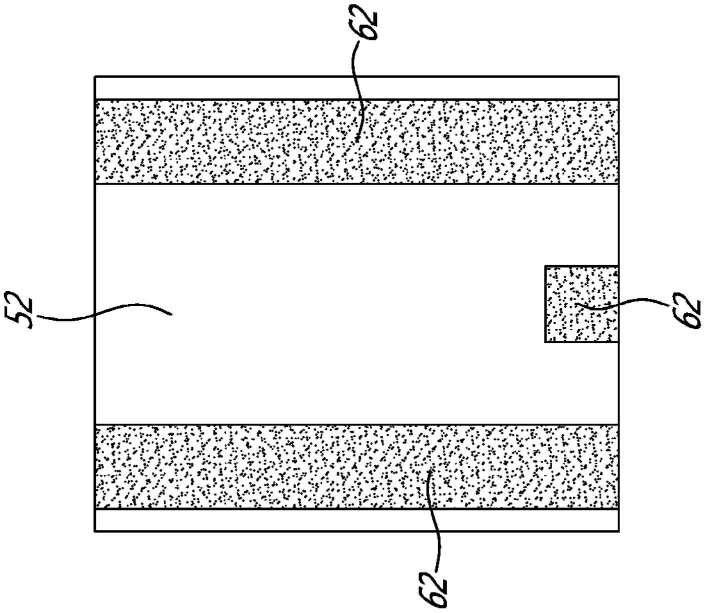
FIG. 6 is a bottom view of an inner layer designed to be assembled with the support of FIG. 5.
Figure 5:
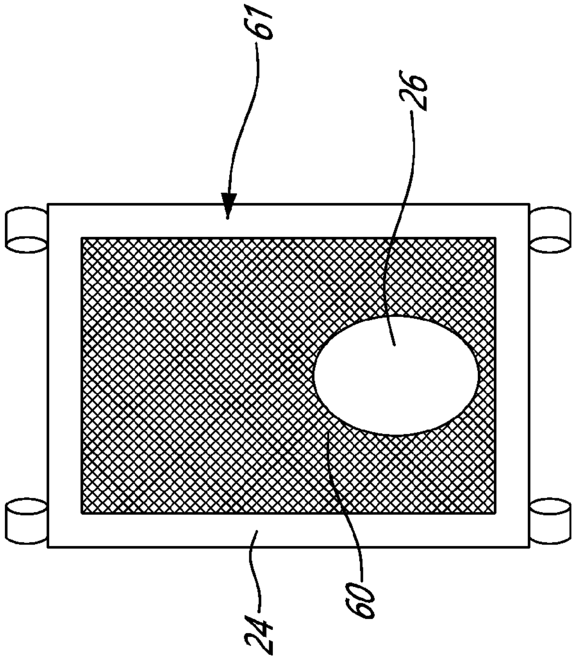
FIG. 5 is a top view of a support of a crotch portion in accordance with another embodiment of the present invention.
Figure 7:
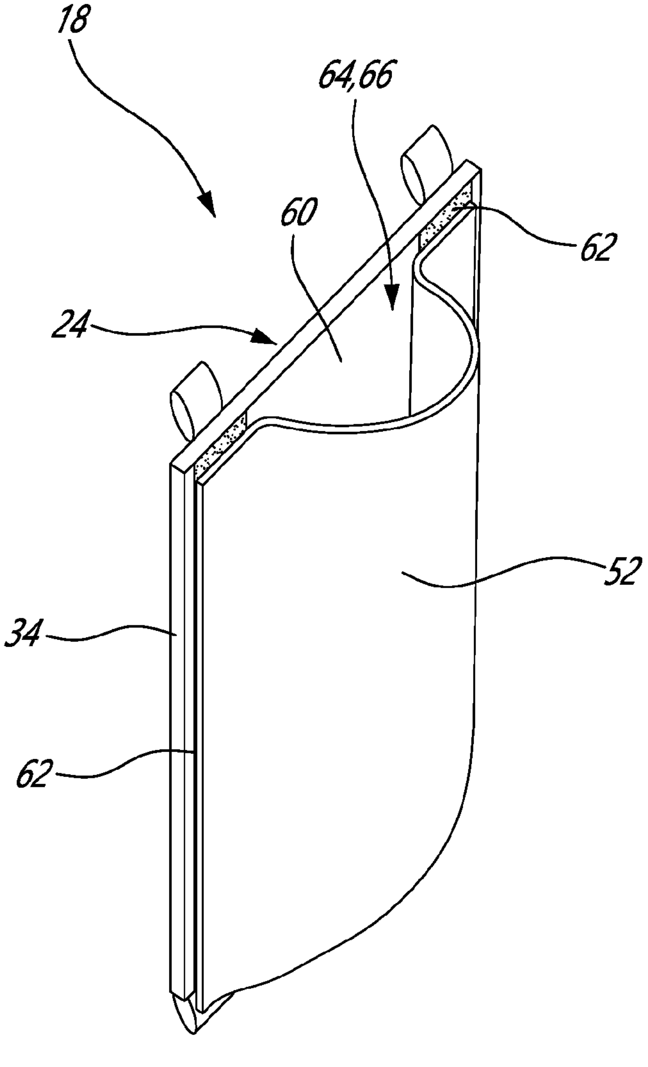
FIG. 7 is a perspective view of the crotch portion made from joining the inner layer of FIG. 6 on the support of FIG. 5.

FIGS. 5 to 7, depicting an optional embodiment of the current harness 10, are now concurrently referred to. FIG. 7 depicts the assembly of the variation of the support 24 shown in FIG. 5 with an inner layer 52 shown in FIG. 6. As depicted in FIG. 5, the support 24 is equipped with a first part fastener 60 on most of its skin-facing surface 61. This first part fastener 60 is the loop portion of a hook-and-loop type of fastener, such as a Velcro® fastener for example. Shown in FIG. 6 is an outer face (facing away from the skin) of an inner layer 52, equipped with a second part fastener 62 on at least a portion of its periphery. The second part fastener 62 is made to engage the first part fastener 60 so that the inner layer 52 sticks to the first part fastener 60 of the support 24. The second part fastener 62 is a hook portion of the hook-and-loop type of fastener. Advantageously, because the support 24 is mostly covered by the loop portion of the fastener, the inner layer 52 may be positioned anywhere on the first part fastener 60. It is therefore possible to create a second pocket 64 of a size adapted to a given model and size of vibrator and snugly fit around it to hold it properly in place. Such a created second pocket 64 is depicted in FIG. 7.

Optionally, the support 24 could be provided without the aperture 26. The second pocket 64 is then used to accommodate a standard type of vibrator (vibrating type, without the suction function). Advantageously, a second opening 66 of the pocket 64 is provided substantially perpendicular to the lateral sides 34 of the support 24 so that a vibrator may be inserted in the second pocket 64 and held in place along its longitudinal axis.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A harness adapted to support a vibrator for hands-free stimulation of a clitoral area of a wearer, the harness comprising:

a waist portion, the waist portion being adapted to surround a waist of the wearer, the waist portion having a front portion and a rear portion respectively adapted to rest on a front and on a rear of the wearer when in use;

a crotch portion, the crotch portion having a support adapted to be in direct contact with a body of the wearer, the support having a frontedge, a rear edge, an aperture and an outer layer, the aperture passing through the support to provide direct contact with the body of the wearer, the outer layer being attached to the support on an outer side of the support opposite the body of the wearer and at least partially between the front edge and the aperture, the outer layer defining a pocket being closed along lateral sides of the support and proximate the rear edge of the support, the pocket having an opening proximate the frontedge, the opening and the aperture reaching inside the pocket, the pocket being elongated along a front-rear axis of the support so as to be operative to receive the vibrator having a longitudinal axis aligned with the front-rear axis and to locate the active extremity of the vibrator within the aperture, the outer layer being operative to secure the vibrator against the support on the outer side of the support, the support being adapted to be positioned intermediate the body of the wearer and the vibrator except for the aperture which is adapted to receive the active extremity of the vibrator so that the active extremity of the vibrator directly contacts the body of the wearer;

a pubis portion, the pubis portion connecting the front portion of the waist portion to the support proximate the front edge, the pubis portion comprising a first length adjuster;

a right leg portion adapted to at least partially surround a right leg of the wearer, the right leg portion connecting the rear portion of the waist portion to the support proximate the rear edge; and a left leg portion adapted to at least partially surround a left leg of the wearer, the left leg portion connecting the rear portion of the waist portion to the support proximate the rear edge, wherein the first length adjuster of the pubis portion is operative to adjust a distance between the front portion of the waist portion and the aperture of the support so that the aperture is located at a predetermined position proximate the clitoral area of the wearer.

2. The harness of claim 1, wherein the crotch portion, the pubis portion, the right leg portion and the left leg portion are made of non-stretchable fabric.

3. The harness of claim 2, wherein the waist portion is made non-stretchable fabric.

4. The harness of claim 3, wherein the right leg portion, the left leg portion and the waist portion each comprise one second length adjuster so as to be adjustable in length.

5. The harness of claim 1, wherein the first length adjuster and the second length adjusters comprise a hook and loop type of fastener.

6. The harness of claim 1, wherein the pocket is adapted to receive one of a suction-type of vibrator or acupressure-type of vibrator, the vibrator having an active nozzle, the aperture being adapted to receive the active nozzle of the vibrator.

7. The harness of claim 1, wherein the pocket is adapted to receive an acupressure type of vibrator.

8. The harness of claim 1, wherein the rear edge is at a predetermined distance from the aperture so that in use, when the aperture is located at the predetermined position proximate the clitoral area of the wearer, the rear edge of the support is located between the clitoral area and a vaginal orifice of the wearer so that the vaginal orifice is uncovered by the support.

9. The harness of claim 1, wherein the waist portion, the right leg portion and the left leg portion are made of webbing.

10. The harness of claim 1, wherein the pubis portion is made of webbing.

11. The harness of claim 1, wherein the crotch portion is detachable from the right leg portion, from the left leg portion and from the pubis portion.

12. The harness of claim 11, further comprising a plurality of detachable attachments, a first of the plurality of detachable attachments removably attaching the crotch portion to the right leg portion, a second of the detachable attachments removably attaching the crotch portion to the left leg portion and a third of the detachable attachments removably attaching the crotch portion to the pubis portion.

13. The harness of claim 12, wherein the detachable attachments are located along one of the front edge and the rear edge of the support.

* * * * *